(12) United States Patent
Ramachandran et al.

(10) Patent No.: US 8,234,639 B2
(45) Date of Patent: *Jul. 31, 2012

(54) AUTONOMIC AUTO-CONFIGURATION USING PRIOR INSTALLATION CONFIGURATION RELATIONSHIPS

(75) Inventors: Puthukode G. Ramachandran, Austin, TX (US); John C. Sanchez, Pflugerville, TX (US); Lorin Evan Ullmann, Austin, TX (US); Mark Williams, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1232 days.

This patent is subject to a terminal disclaimer.

(21) Appl. No.: 11/967,362

(22) Filed: Dec. 31, 2007

(65) Prior Publication Data

US 2008/0148255 A1 Jun. 19, 2008

Related U.S. Application Data

(63) Continuation of application No. 10/697,866, filed on Oct. 30, 2003, now Pat. No. 7,334,226.

(51) Int. Cl.
*G06F 9/445* (2006.01)
*G06F 9/44* (2006.01)

(52) U.S. Cl. ......... 717/177; 717/172; 717/173; 717/174

(58) Field of Classification Search .................. None
See application file for complete search history.

(56) References Cited

U.S. PATENT DOCUMENTS

| | | | |
|---|---|---|---|
| 5,247,683 A | 9/1993 | Holmes et al. | |
| 5,835,911 A | 11/1998 | Nakagawa et al. | |
| 5,919,247 A | 7/1999 | Van Hoff et al. | |
| 5,978,594 A | 11/1999 | Bonnell et al. | |
| 6,119,153 A | 9/2000 | Dujari et al. | |
| 6,138,153 A | 10/2000 | Collins, III et al. | |
| 6,298,378 B1 | 10/2001 | Angal et al. | |
| 6,327,617 B1 | 12/2001 | Fawcett | |
| 6,351,467 B1 | 2/2002 | Dillon | |
| 6,405,362 B1 | 6/2002 | Shih et al. | |
| 6,501,995 B1 | 12/2002 | Kinney et al. | |
| 6,532,392 B1 | 3/2003 | Eryurek et al. | |
| 6,751,794 B1 | 6/2004 | McCaleb et al. | |
| 6,769,118 B2 * | 7/2004 | Garrison et al. | ............... 717/177 |
| 6,802,061 B1 * | 10/2004 | Parthasarathy et al. | ........ 717/173 |

(Continued)

OTHER PUBLICATIONS

Sanna et al., Lightweight Client-Pull Protocol for Mobile Communication, 2005, 5 pages, <http://publications.crs4.it/pubdocs/2005/SVPM05a/crs4_1009.pdf>.*

(Continued)

*Primary Examiner* — Thuy Dao
(74) *Attorney, Agent, or Firm* — Yee & Associates, P.C.; Steven L. Bennett

(57) ABSTRACT

A method, apparatus, and computer instructions for installing software in a network data processing system. An event is detected in the network data processing system indicating that a software module is to be installed in a set of data processing systems in the network data processing system. A configuration of each data processing system in the set of data processing systems is discovered, and a set of instructions is created using a knowledge base of prior installations. The set of instructions is tailored for each data processing system in the set of data processing systems based on the configuration for the each data processing system in the set of data processing systems. The set of instructions for the software module to be installed is sent to the set of data processing systems.

7 Claims, 5 Drawing Sheets

U.S. PATENT DOCUMENTS

| | | | |
|---|---|---|---|
| 6,990,660 B2 | 1/2006 | Moshir et al. | |
| 7,100,158 B2 * | 8/2006 | Nakane et al. | 717/172 |
| 7,143,337 B2 | 11/2006 | Landsman et al. | |
| 7,219,344 B2 | 5/2007 | Chenelle et al. | |
| 7,334,226 B2 * | 2/2008 | Ramachandran et al. | 717/177 |
| 7,552,432 B2 * | 6/2009 | Aiba | 717/177 |
| 7,770,166 B2 * | 8/2010 | Oh | 717/174 |
| 2003/0066065 A1 * | 4/2003 | Larkin | 717/177 |
| 2004/0003266 A1 * | 1/2004 | Moshir et al. | 713/191 |
| 2005/0257215 A1 * | 11/2005 | Denby et al. | 717/172 |

OTHER PUBLICATIONS

Bozdag et al., A Comparison of Push and Pull Techniques for AJAX, 2007, 12 pages, <http://arxiv.org/ftp/arxiv/papers/0706/0706.3984.pdf>.*

Bagchi et al., Achieving Communication Efficiency through Push-Pull Partitioning of Semantic Spaces in Client-Server Architectures, 2005, 27 pages, <citeseerx.ist.psu.edu/viewdoc/download?doi=10.1.1.77.pdf>.*

Office Action regarding U.S. Appl. No. 10/697,866, dated Oct. 23, 2006.

Response to Office Action regarding U.S. Appl. No. 10/697,866, dated Jan. 18, 2007.

Office Action regarding U.S. Appl. No. 10/697,866, dated Apr. 16, 2007.

Response to Office Action regarding U.S. Appl. No. 10/697,866, dated Jul. 16, 2007.

Notice of Allowance regarding U.S. Appl. No. 10/697,866, dated Sep. 28, 2007.

Amendment under 37 C.F.R. 1.312 regarding U.S. Appl. No. 10/697,866, dated Nov. 8, 2007.

"Introducing IBM Tivoli Configuration Manager—Version 4.2", Oct. 2002 retrieved at <publib.boulder.ibm.tividd/td/ITCM/GC23-4703-00>.

* cited by examiner

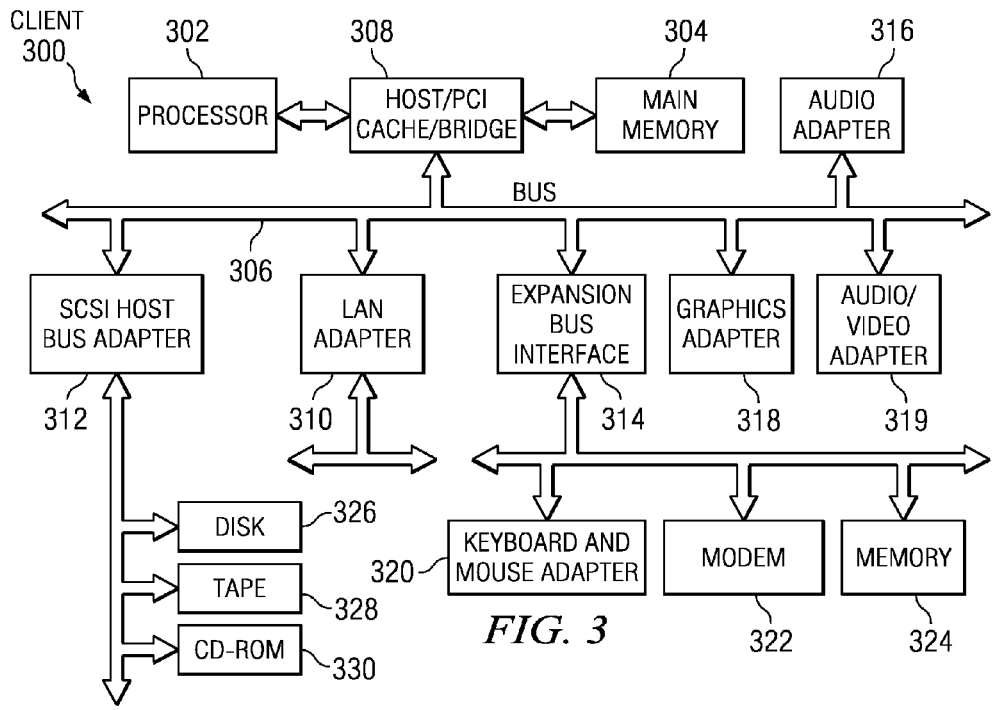
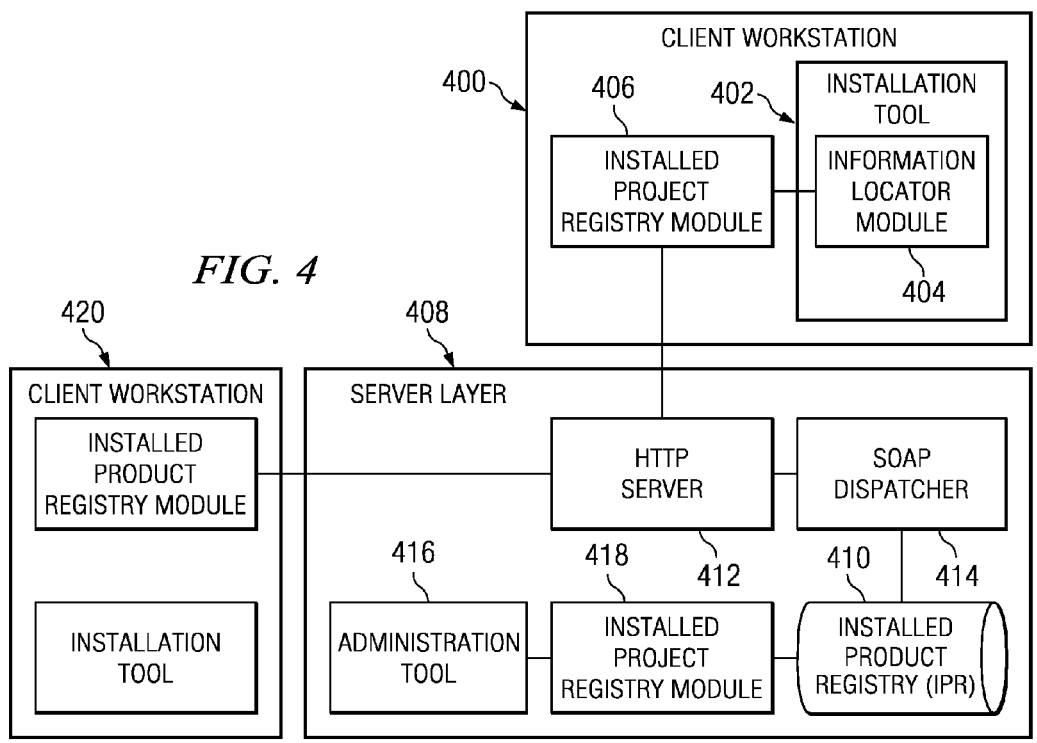

AUTONOMIC AUTO-CONFIGURATION USING PRIOR INSTALLATION CONFIGURATION RELATIONSHIPS

This application is a continuation of application Ser. No. 10/697,866, filed Oct. 30, 2003 now U.S. Pat. No. 7,334,226.

BACKGROUND OF THE INVENTION

1. Technical Field

The present invention relates generally to an improved data processing system and in particular to a method and apparatus for distributing software. Still more particularly, the present invention relates to a method, apparatus, and computer instructions for performing autonomic event triggered auto-configuration or install based on previously installed products.

2. Description of Related Art

As the size of an enterprise or business continues to grow, the number of workstations within the enterprise or business continues to increase. The task of managing configuration of these workstations becomes more complex for administrators, since configuration of mission-critical applications has to be under close control as the vendor updates versions of software. In addition, safe and efficient deployment of applications without disrupting productivity and security of deployment becomes very important. Inventory reports on assets of workstations also are needed in order to maintain accurate license information.

Conventionally, installation of software products is performed by a user of the workstation. The installation is performed by a user who manually pulls the software product from a central server on a local area network or from the Internet. Local client installer software normally triggers the installation upon user's request to install a particular software package or application. When the user requests a particular software package or application, authentication and authorization is performed on the user workstation before the installation to verify the identity of the user. However, the local installer software does not save away the settings of the previous installs in any form for future installation on the same client.

Furthermore, installation information answered by the user that is not specific to the user, for example server hostname and port number, is not recorded in any way to be reused for future installation. To the contrary, most existing installation utility discards the information entered by the user once the installation is complete. When a successful installation is completed, the existing installation utility does not register the newly installed product to allow discovery of the product in future installations of other products. This discovery helps to control the inventory of the software products distributed among the workstations.

During normal business operations, when a new employee joins a department of the organization, new software products are needed for the new employee. An administrator manually gathers a profile to determine what type of software products are necessary for the new employee to perform the job. The installation information is often not included in the profile. As a result, the underlying details of the installation, such as software version of the installed product, may be overlooked. In addition, if multiple deployments are required to install products on multiple machines. This task becomes even more cumbersome for administrator to perform.

Therefore, it would be advantageous to have an improved method, apparatus, and computer instructions for performing autonomic event triggered auto-configuration or install based on previously installed products by detecting an event that indicates a software module is to be installed on the client workstations so that a push may be scheduled on the client workstation to later pull the software module from the installation server.

SUMMARY OF THE INVENTION

The present invention provides a method, apparatus, and computer instructions for installing software in a network data processing system. An event is detected in the network data processing system in which the event indicates that a software module is to be installed in a set of data processing systems in the network data processing system. A configuration of each data processing system in the set of data processing systems is discovered, and a set of instructions is created using a knowledge base of prior installations. The set of instructions is tailored for each data processing system in the set of data processing systems based on the configuration for the each data processing system in the set of data processing systems. The set of instructions for the software module to be installed is sent to the set of data processing systems.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a diagram illustrating components used in performing autonomic auto-configuration or install using detected relationships with prior product installation configuration in accordance with a preferred embodiment of the present invention;

DETAILED DESCRIPTION OF THE PREFERRED EMBODIMENT

Figure 1:
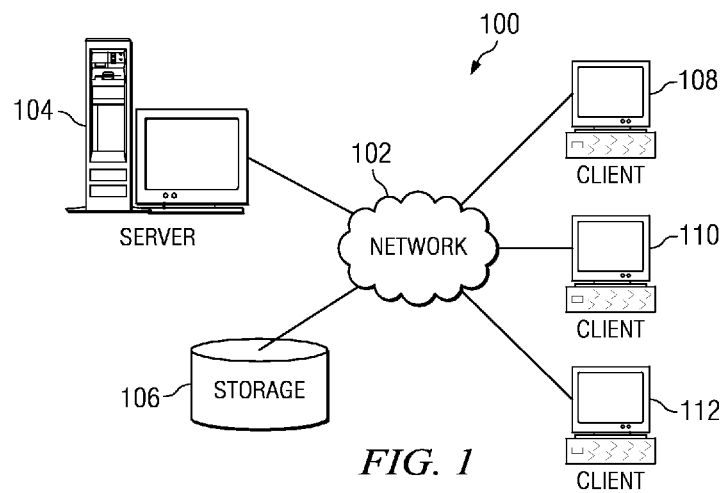
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communication links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
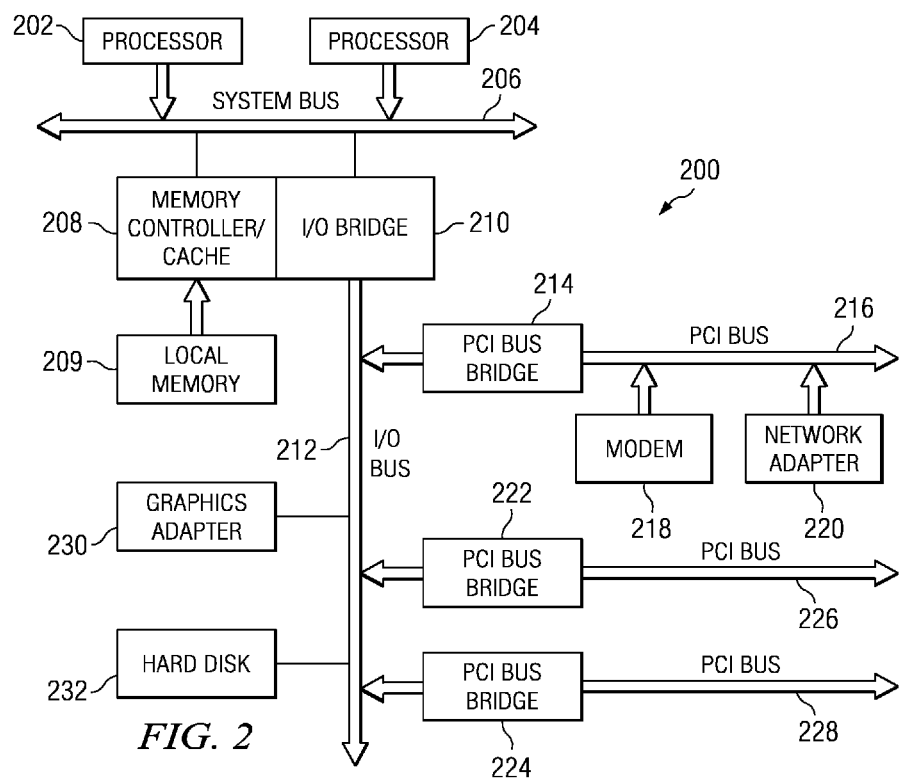
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communication links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

The depicted example in FIG. 3 and above-described examples are not meant to imply architectural limitations. For example, data processing system 300 also may be a notebook computer or hand held computer in addition to taking the form of a personal digital assistant (PDA). Data processing system 300 also may be a kiosk or a Web appliance.

The present invention provides a method, apparatus, and computer instructions for performing autonomic auto-configuration or install using detected relationships with prior product installation configuration information from client workstations. The mechanism of the present invention allows for detecting an event that requires a software installation on client workstations by using an autonomic event engine. The autonomic event engine consists of a repository or knowledge base also referred to as an installed product registry (IPR). The IPR contains installation information such as network configuration for connectivity and associated database table and host name.

The installation information is gathered by the IPR upon a successful prior installation at a customer's site. IPR also may store installation information that a client or user may have entered during installation, for example, server name and location. IPR repository may be interfaced with other back-end implementation such as DB2 Universal Database, which is a product available from International Business Machines Corporation, to improve scalability of data storage.

The mechanism of the present invention utilizes an installation tool, such as the Install Assistant in the IBM Tivoli Configuration Manager 4.2, a product from International Business Machines Corporation. The installation tool is configured to enable previously installed application information such as database name and port number to be shared by the same or different workstations. When a future install occurs, the new application may reuse the installation information from the previously installed application by searching the IPR.

In an illustrative embodiment of the present invention, the installation tool also may be configured to remember answers to previously asked questions during a prior installation. Particularly, installation information that is relevant to future installs, such as, for example, Web server host and port number may be reused for installation on a different machine. Moreover, the installation tool may be configured in an illustrative example to register newly installed product by storing relevant application information to the IPR. This information is used in future installs to allow the newly installed product to be discovered. This registration helps to better maintain inventory of the software installed on client workstations.

Turning now to FIG. 4, a diagram illustrating components used in performing autonomic auto-configuration or install using detected relationships with prior product installation configuration is depicted in accordance with a preferred embodiment of the present invention. As depicted in FIG. 4, in this example implementation, a client workstation 400, may be implemented by using the data processing system described in 300 in FIG. 3. Another client workstation 420 similar to 400 is also shown in FIG. 3.

Installation tool 402 resides on client workstation 400 and may be used in an illustrative embodiment of the present invention to facilitate installation of software product from the client. An example of the installation tool is the Install Assistant in the IBM Tivoli Configuration Manager 4.2, a product of IBM Corporation. Installation tool 402 includes information locator module 404, which is used by installation tool 402 to locate installation information from previously installed application on client workstation 400.

Information locator module 404 uses IPR module 406 to gather relevant information for the in-progress install. The relevant information is gathered in the illustrative examples by utilizing an Install Shield Multi Platform (ISMP) string resolver methods and helper classes application program interface (API) to provide default responses to install entry fields, to retrieve connectivity information such as database name, host and port; and to retrieve values from previous answered questions by the user.

The IPR module 406 is a client-server bridge layer in the examples of the present invention that provides a client interface to the IPR and a Java™ naming and directory interface (JNDI) provider implementing a subset of directory functionality (Java is a trademark of Sun Microsystems, Inc.). JNDI, a product of Sun Microsystems, Inc., is an API specified in Java that provides naming and directory functionality to applications written in Java. JNDI provides methods for performing standard directory operations, such as associating attributes with objects and searching for objects using their attributes. The mechanism of the present invention uses IPR module 406 to discover and communicate with a local or remote IPR, such as IPR 410.

Also shown in FIG. 4, server layer 408 may be implemented in a server such as server 104 in FIG. 1. In one example of an implementation of the present invention, server layer 408 provides the communication to remote IPR 410 using the simple object access protocol (SOAP) over hypertext transfer protocol (HTTP) to HTTP server 412 and SOAP dispatcher 414. HTTP server 412 may be implemented using WebSphere, a product by International Business Machines Corporation. The Web server is the HTTP request handler for the remote IPR 410. SOAP, a W3C consortium standard, allows remote object level access by exchanging structured and typed information between peers in a decentralized, distributed environment using XML. When the Web server receives a remote IPR request to access installation information from client IPR module 406, SOAP dispatcher 414 in the illustrative examples of the present invention translates the SOAP XML messages sent from client IPR module 406 to a method call on a registered SOAP object of remote IPR 410 after the uniform resource locator (URL) of remote IPR 410 is discovered.

In a preferred embodiment of the present invention, IPR 410 is a repository or knowledge base of information gathered from previous installs to assist in future software installation on client workstation 400. As described above, IPR 410 may be implemented using a more scalable data store, such as DB2 Universal database. After a product is successfully installed, IPR 410 contains product instance information such as, for example, global unique instance identifier, product identifier, answers to previous installation questions, and connectivity information. Lastly, admin tool 416 may be implemented in server layer 408 using command line utilities for the administrator to manually modify the registry of IPR 410 through IPR module 418.

Figure 5:
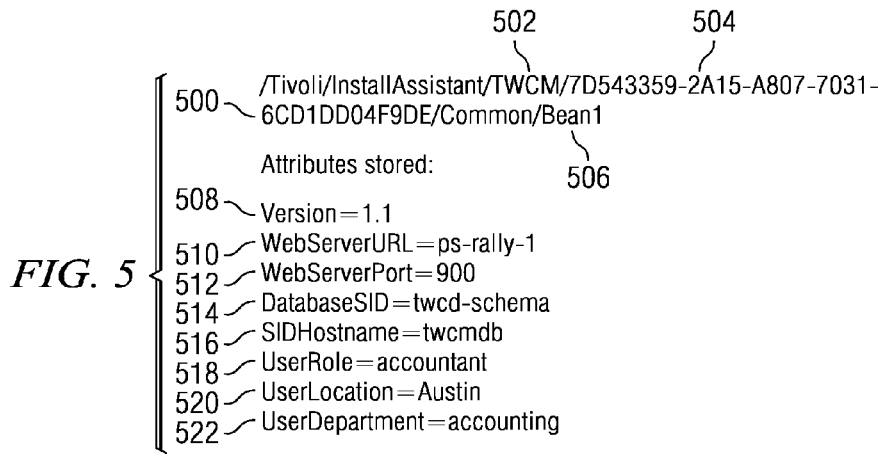
FIG. 5 is a diagram illustrating example data content in the installed product registry (IPR) in accordance with a preferred embodiment of the present invention.

Turning next to FIG. 5, a diagram illustrating example data content in the installed product registry (IPR) is depicted in accordance with a preferred embodiment of the present invention. As depicted in FIG. 5, in this illustrative example, path 500 is automatically created by the IPR to store attributes of the product and the product version gathered from Install Shield Multi Platform (ISMP). ISMP is a product available from InstallShield Corporation. Path 500 may be instance or common based. Instance based path creates an entry in the IPR for each instance of an installed product. Common path is used for all installs of the same product, regardless whether the product is installed on the same or different machine. Within path 500, "/TWCM" 502 is the product name derived from ISMP. "/7D543359-2A15-A807-7031-6CD1DD04F9DE" 504 is the unique 128-bit product ID provided by the ISMP. If ISMP is not used, a 128-bit uuid is generated. For an instance-based path, a unique 128-bit instance ID is generated for an installed product. If ISMP is not used, a 128-bit uuid must be generated. For a common path, the BeanID 506 is the name associated with the product bean in ISMP. Following path 500, attributes are stored in a name and value hierarchical format in the IPR. These attributes include product version 508, Web server location 510, Web server port number 512, database ID 514 and the database host name 516. User identity attributes such as user role 518, user location 520 and user department 522 also may be stored in the IPR.

Figure 6:
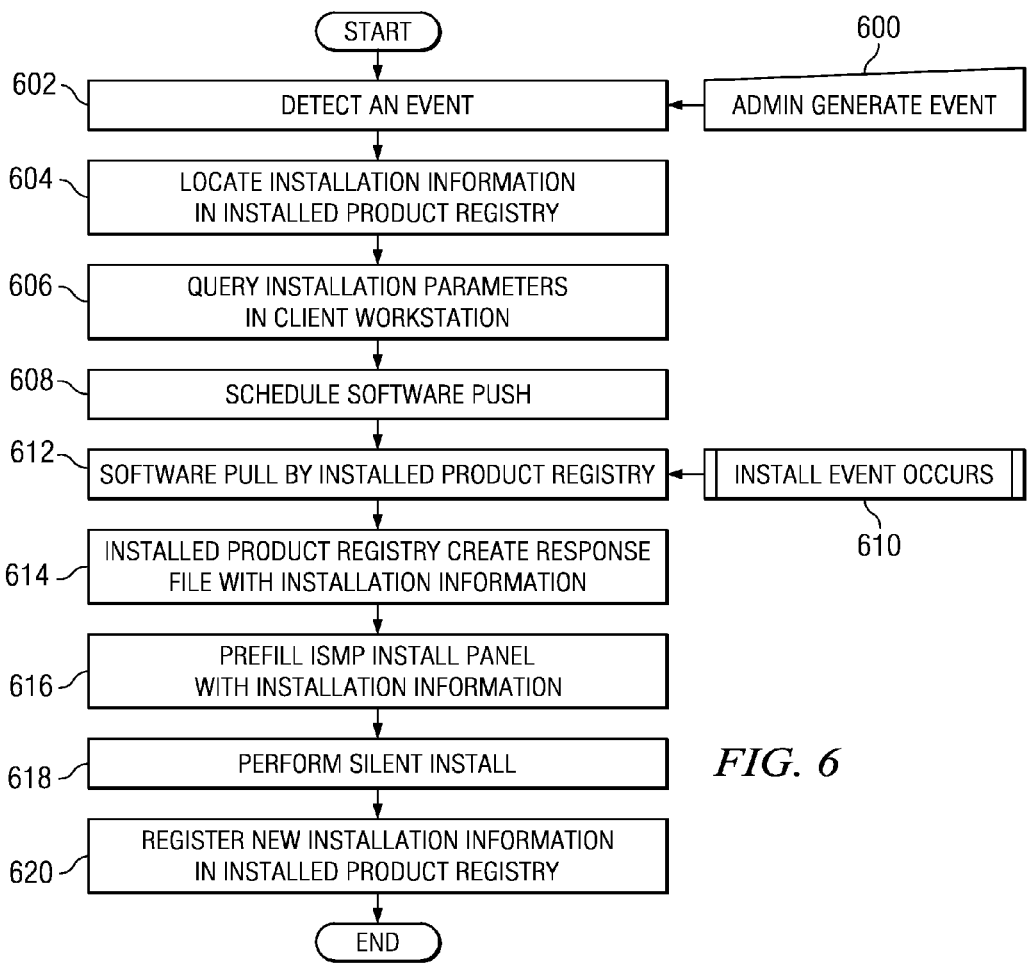
FIG. 6 is a flowchart of an example process for performing autonomic auto-configuration or install using detected relationships with prior product installation configuration in accordance with a preferred embodiment of the present invention.

Turning next to FIG. 6, a flowchart of an example process for performing autonomic event triggered auto-configuration or install based on previously installed products is depicted in accordance with a preferred embodiment of the present invention. As depicted in FIG. 6, from the autonomic event engine's perspective, the process begins when an event is generated by the administrator is received (step 600), for example, when the administrator adds the new employee who recently joins the department and requests software product to be installed on the new employee's workstation. The autonomic event engine detects the event generated by the administrator (step 602) and immediately tries to locate installation information in the IPR (step 604) for another employee who performs similar duties, for example same job description or job location. The location of this information is accomplished by mapping user identity attributes that are stored in the IPR such as attributes 518, 520, and 522 in FIG. 5 to the new employee's attributes entered by the administrator.

Once installation information of software products needed is located in the IPR, installation parameters that are specific to the new employee on the new employee's workstation are queried (step 606), such as network connectivity information. The scheduler of the autonomic event engine then schedules a push of the required software products to the new employee's workstation (step 608). When the scheduled time arrives and an install event occurs (step 610), a software pull is initiated by the IPR from the workstation to retrieve software products to be installed on the new employee's workstation (step 612). The software pull may involve Web software downloads required by other software.

Next, a response file is created by the IPR, which includes a combination of installation information of the new employee and the other employee whose installation information is stored by the IPR for future installs (step 614). Relationships are detected between the target user identity, who will use the software product, and prior user installation configuration data. A set of attributes not limited to be similar to the ones in FIG. 5 are used to create the response file. For example, this response file is created when relationships are detected between the new employee and current employees by mapping the user identity attributes stored in the IPR. The user identity attributes may be attributes such as user role, group, department, and user location. The user identity attributes shown in FIG. 5 are for illustrative purposes and may not be limited to the attributes listed. Other attributes, such as user group and user name, also may be stored to perform mapping.

Finally, the install panel of the ISMP is pre-filled with the attributes given in the response file (step 616) and the IPR then drives the silent ISMP install on the new employee's workstation (step 618). Upon successful completion of the install, the newly installed product information is registered in the IPR so that the product may be discovered in the future installs (step 620), and the process terminates thereafter.

Figure 7:
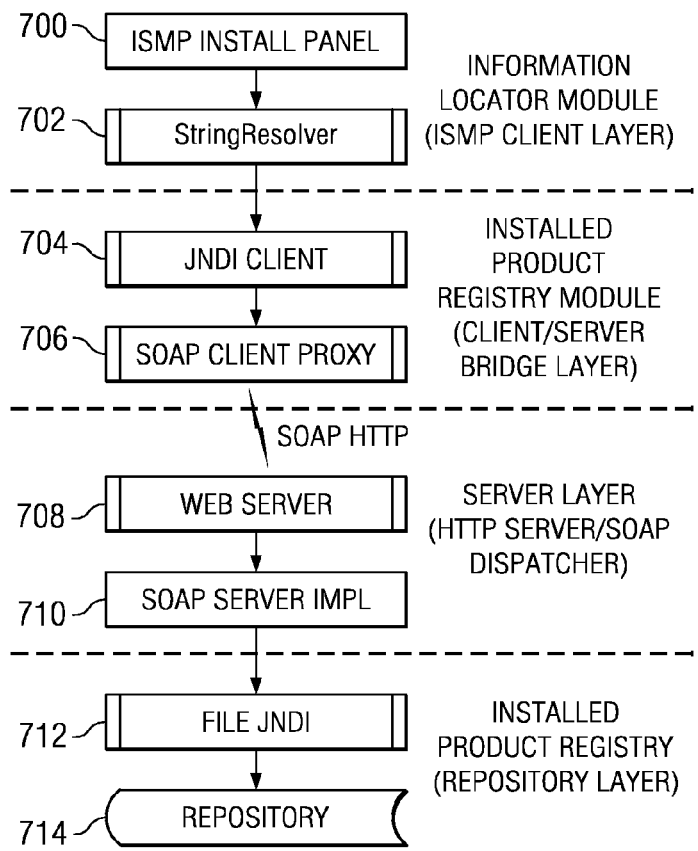
FIG. 7 is a diagram illustrating architecture layers used in performing autonomic auto-configuration or install using detected relationships with prior product installation configuration in accordance with a preferred embodiment of the present invention.

Turning next to FIG. 7, a diagram illustrating architecture layers used in performing autonomic event triggered auto-configuration or install based on previously installed products is depicted in accordance with a preferred embodiment of the present invention. As depicted in FIG. 7, the first layer is the ISMP client layer, which contains ISMP install panel 700 and string resolver 702 within the information location module. ISMP install panel 700 is a user input panel that allows user to enter text input fields. When a silent ISMP install is performed, ISMP install panel 700 is pre-filled with installation information retrieved from the IPR by using methods and classes from the helper API in string resolver 702. String resolver 702 is the ISMP registered string resolver that is the helper API for storing and retrieving values in the IPR.

The next layer is the client server bridge layer, which contains JNDI client 704 and SOAP client proxy 706. JNDI client 704 is a JNDI standard-compliant interface used mainly by the helper API methods, such as string resolver 702. However, if helper methods provided by the helper API are insufficient, a subset of the JNDI API is supported. SOAP client proxy 706 is a private API that translates the JNDI client calls into appropriate SOAP XML messages to a SOAP server. The calls are sent over HTTP.

Below the client server bridge layer is the server layer, which contains the Web server, in this case Tomcat Web server 708, and a SOAP server impl 710. The Web server is HTTP server 412 that is described in FIG. 4. Web server 708 receives SOAP request messages and forwards them to the SOAP API which calls the IPR service. SOAP server impl 710 is the service called by the SOAP API in response to the IPR method requests received from Web server 708. The last layer is the repository layer, which contains File JNDI 712 and the IPR repository 714. File JNDI 712 is the actual IPR file repository management API that manages storing the values received from JNDI client 704. Repository 714 is the data store in which persistent installation information is stored.

Figure 8:
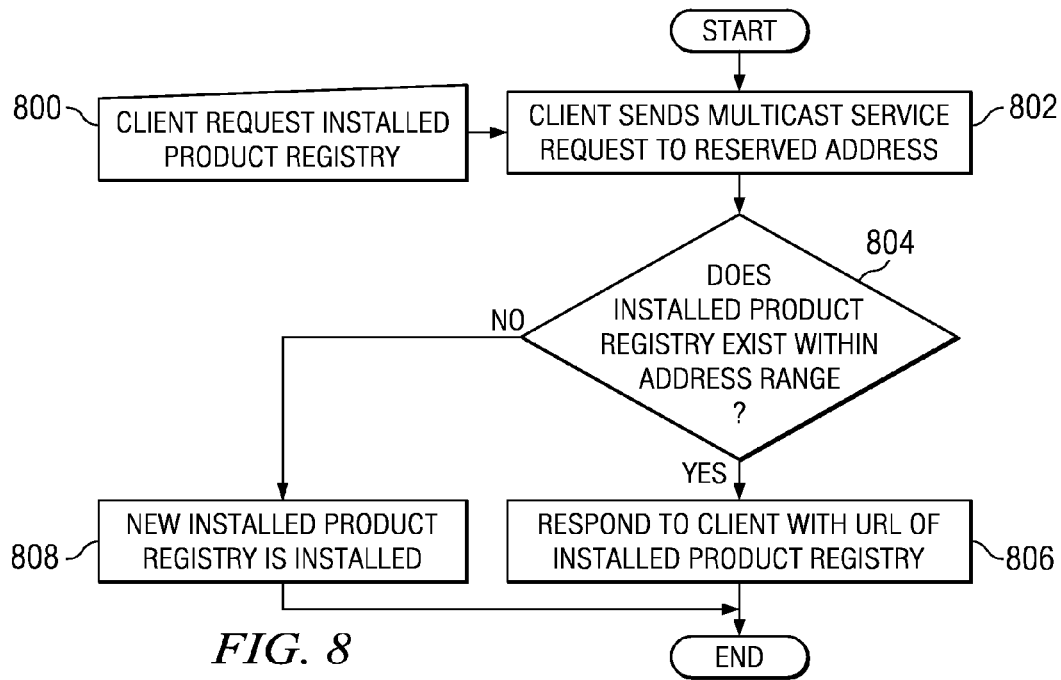
FIG. 8 is a flowchart of a discovery process for discovering the IPR in accordance with a preferred embodiment of the present invention.

Turning next to FIG. 8, a flowchart of a discovery process for discovering the IPR is depicted in accordance with a preferred embodiment of the present invention. As depicted in FIG. 8, from the client's perspective, the process begins when the client tries to locate the IPR (step 800), a multicast request is sent by the client to a reserved IP multicast address (step 802). A determination is then made as to whether an IPR is located within the reserved multicast address range (step 804). If an IPR is located, a URL of the IPR is returned (step 806) and the process terminates thereafter. If an IPR is not located within the range of the reserved multicast address range, a new IPR may be installed on the client (step 808) with the process terminating thereafter.

Figure 9:
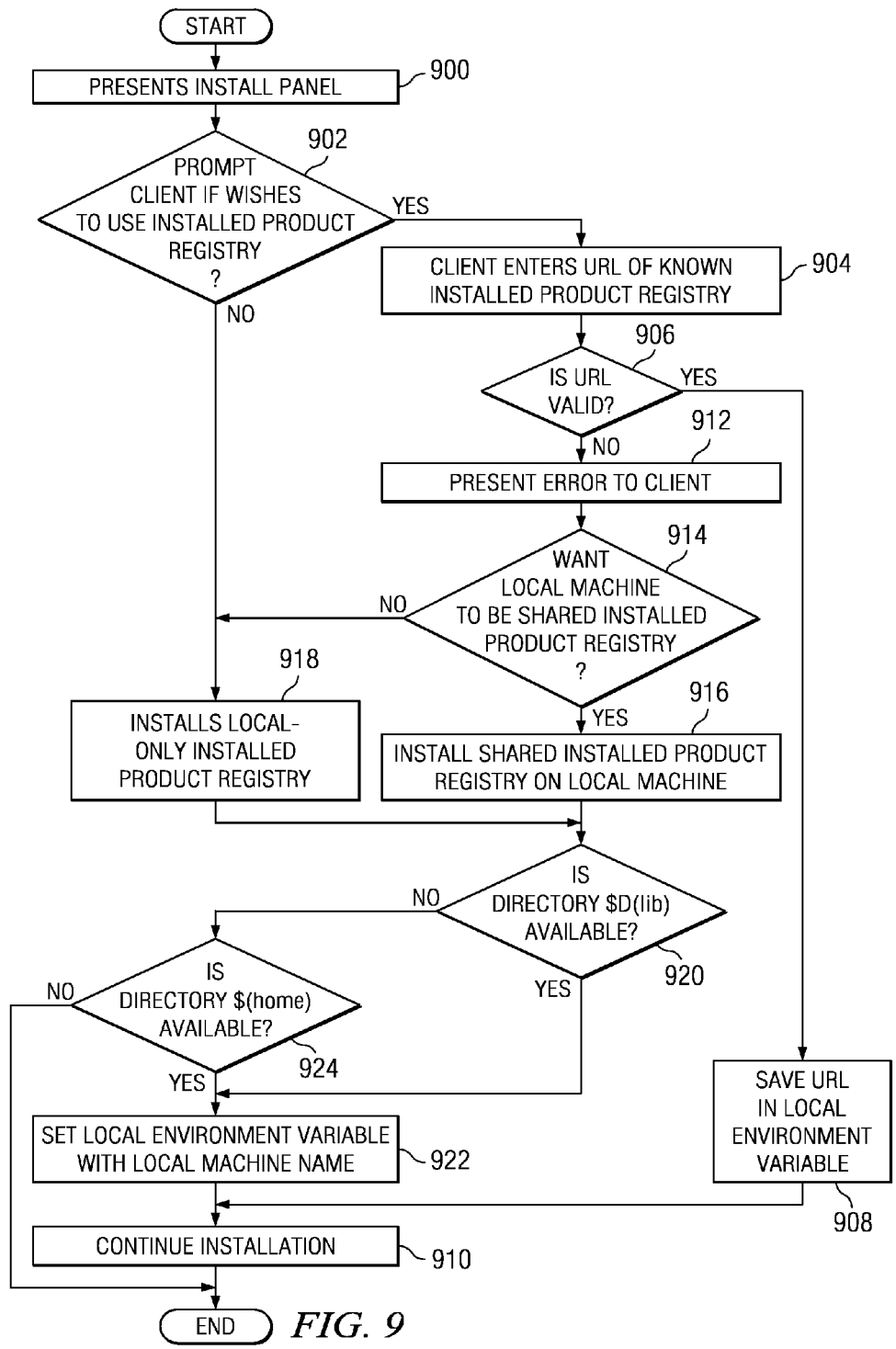
FIG. 9 is a flowchart of an installation process for installing the IPR on the client in accordance with a preferred embodiment of the present invention.

Turning next to FIG. 9, a flowchart of an installation process for installing the IPR on the client is depicted in accordance with a preferred embodiment of the present invention. This process is a more detailed description of step 808 in FIG. 8.

As depicted in FIG. 9, from the autonomic event engine's perspective, the process begins when a series of install panels are presented to the user at the client for installation (step 900). A determination is then made by the user as whether to use the features of the IPR (step 902). If the user chooses to use the IPR features, the user may enter the URL of the known IPR (step 904). After the URL is entered, a determination is made as to whether the URL is a valid location (step 906). If the location is valid, the valid URL is saved in a local environment variable IPR_LOCATION (step 908), and the installation continues (step 910), with the process terminating thereafter.

If the location is invalid, an error is presented to the user (step 912), and a determination is then made as whether the user wants the local machine to become a shared IPR (step 914). If the user agrees to allow the local machine to become a shared IPR, a shared IPR is installed on the local machine (step 916). If the user does not agree to allow the local machine to become a shared IPR, a local-only IPR is installed on the local machine instead (step 918).

From either step 916 or step 918, the installation process attempts to place the IPR files or binaries in the $D(lib) directory, a determination is made as to whether the $D(lib)

directory exists on the local machine (step 920). If $D(lib) directory exists on the local machine, the local environment variable IPR_LOCATION is set with the local machine name (step 922) and the installation continues as described in step 910.

If $D(lib) does not exist on the local machine, a determination is made further as to whether $(home) directory exists on the local machine (step 924). If the $(home) directory exists on the local machine, the local environment variable IPR_LOCATION is set as described in 922 and the process continues to step 910. If the $(home) directory fails to exist on the local machine, the IPR files and binaries are unable to be installed and the user may not use the features of the IPR. The process terminates thereafter.

However, if the user chooses not to use the features of the IPR from step 902, a local-only IPR is installed on the local machine and process 920 follows as described above. Once the installation is completed in step 910, the process terminates thereafter.

Therefore, the mechanism of the present invention allows the administrator to minimize the effort of deploying software products among multiple client workstations by saving away installation information that is not specific to a client and answers questions asked by the user during prior installations. In addition, by using the innovative features of the present invention, events are detected in a predictive manner to install and schedule software push to client workstations. Hence, the existing solution of writing administrative scripts to perform batch software installs is eliminated.

Furthermore, the mechanism of the present invention may not be limited to initiating software pull at a later time from the user workstation using ISMP. A command line utility may be used to replace the existing graphical user interface for retrieving text values from the IPR in order to pre-fill the parameters of a software installation executable file. The mechanism of the present invention provides flexibility to use the features of the IPR temporarily by installing a local-only IPR, which may be uninstalled after the testing is completed.

The present invention also provides a secure and efficient method in the client server bridge layer that uses HTTP and SOAP API for accessing specific objects from a remote shared IPR. This method is enabled by using a generic HTTP port, for example port 80, so that any client workstations, even from behind a firewall, is able to access the registry within the IPR.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A data processing system for installing software in a network data processing system, the data processing system comprising:
   a bus system;
   a communications unit connected to the bus system;
   a memory connected to the bus system, wherein the memory includes a set of instructions; and
   a processing unit connected to the bus system, wherein the processing unit executes the set of instructions to detect an event in the network data processing system in which the event indicates that a software module is to be installed in a set of data processing systems in the network data processing system; discover a configuration of each data processing system in the set of data processing systems; create a set of instructions using a knowledge base of prior installations in which the set of instructions is tailored for each data processing system in the set of data processing systems based on the configuration for the each data processing system in the set of data processing systems, wherein the set of instructions includes a future time to request the software module from an installation server, and wherein the set of instructions are operable for subsequent execution on each client data processing system in the set of client data processing systems to pull the software module from the installation server and install the software module on the set of client data processing systems, and wherein the knowledge base of prior installations is located in an installed product registry at the data processing system and includes a mapping between user identities and prior user installation configuration data that was previously used when configuring a previously installed version of the software module; and
   send the set of instructions for the software module to be installed to the set of data processing systems.

2. A data processing system for installing software in a network data processing system, the data processing system comprising a data processor coupled to a memory having instructions stored therein that are executable by the data processor to perform steps of:
   detecting an event in the network data processing system, wherein the event indicates that a software module is to be installed in a set of data processing systems in the network data processing system, wherein the set of data processing systems is at least one data processing system;
   discovering a configuration of each data processing system in the set of data processing systems;
   creating a set of instructions using a knowledge base of prior installations, wherein the set of instructions is tailored for each data processing system in the set of data processing systems based on the configuration for the each data processing system in the set of data processing systems, wherein the set of instructions includes a future time to request the software module from an installation server, and wherein the set of instructions are operable for subsequent execution on each client data processing system in the set of client data processing systems to pull the software module from the installation server and install the software module on the set of client data processing systems, and wherein the knowledge base of prior installations is located in an installed product registry at the data processing system and includes a mapping between user identities and prior user installation configuration data that was previously used when configuring a previously installed version of the software module; and sending the set of instructions for the software module to be installed to the set of data processing systems.

3. The data processing system of claim 2, wherein the installation server is the server data processing system.

4. The data processing system of claim 2, wherein the prior user installation configuration data comprises answers a user provided to questions that were asked during installation of the previously installed versions of the software module.

5. A computer program product in a computer recordable-type medium and operable by a server data processing system for installing software in a network data processing system, the computer program product comprising:

first instructions for detecting an event in the network data processing system, wherein the event indicates that a software module is to be installed in a set of data processing systems in the network data processing system, wherein the set of data processing systems is at least one data processing system;

second instructions for discovering a configuration of each data processing system in the set of data processing systems;

third instructions for creating a set of instructions using a knowledge base of prior installations, wherein the set of instructions is tailored for each data processing system in the set of data processing systems based on the configuration for the each data processing system in the set of data processing systems, wherein the set of instructions includes a future time to request the software module from an installation server, and wherein the set of instructions are operable for subsequent execution on each client data processing system in the set of client data processing systems to pull the software module from the installation server and install the software module on the set of client data processing systems, and wherein the knowledge base of prior installations is located in an installed product registry at the server data processing system and includes a mapping between user identities and prior user installation configuration data that was previously used when configuring a previously installed version of the software module; and fourth instructions for sending the set of instructions for the software module to be installed to the set of data processing systems.

6. The computer program product of claim 5, wherein the installation server is the server data processing system.

7. The computer program product of claim 5, wherein the prior user installation configuration data comprises answers a user provided to questions that were asked during installation of the previously installed versions of the software module.

* * * * *